P. SZYDLOWSKI.
STEERING WHEEL LOCK FOR MOTOR DRIVEN VEHICLES.
APPLICATION FILED SEPT. 14, 1917.
1,267,476.
Patented May 28, 1918.
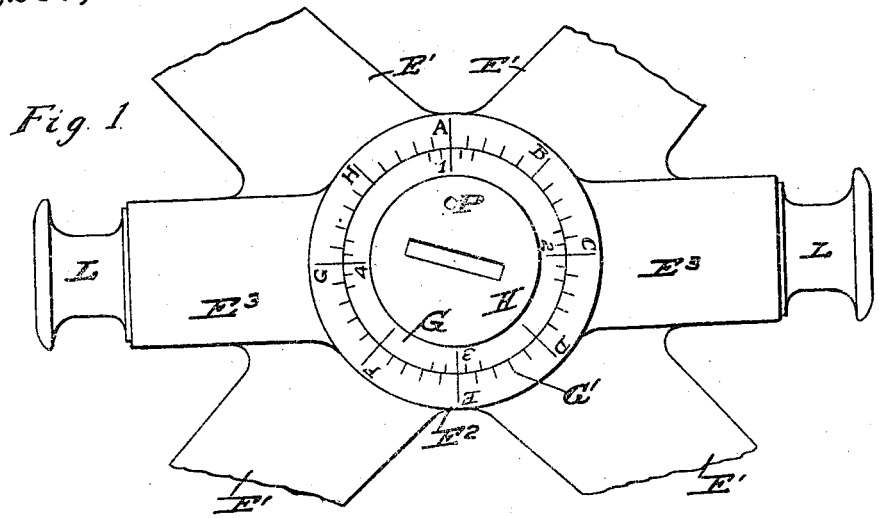
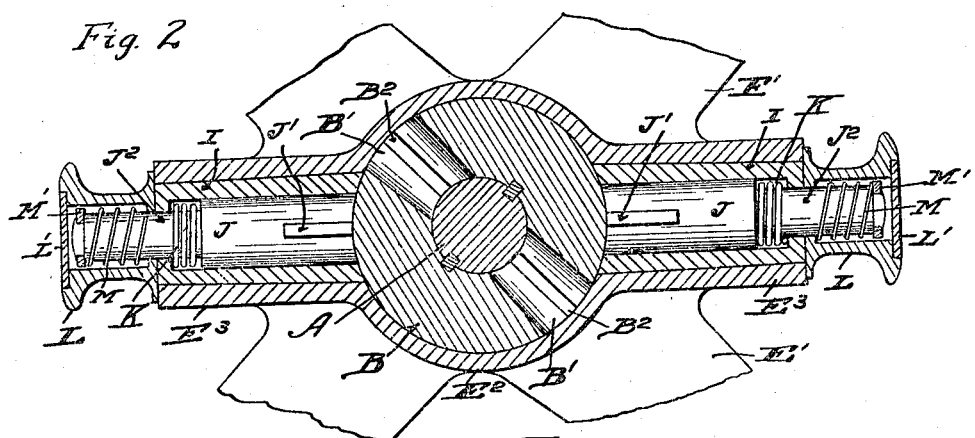
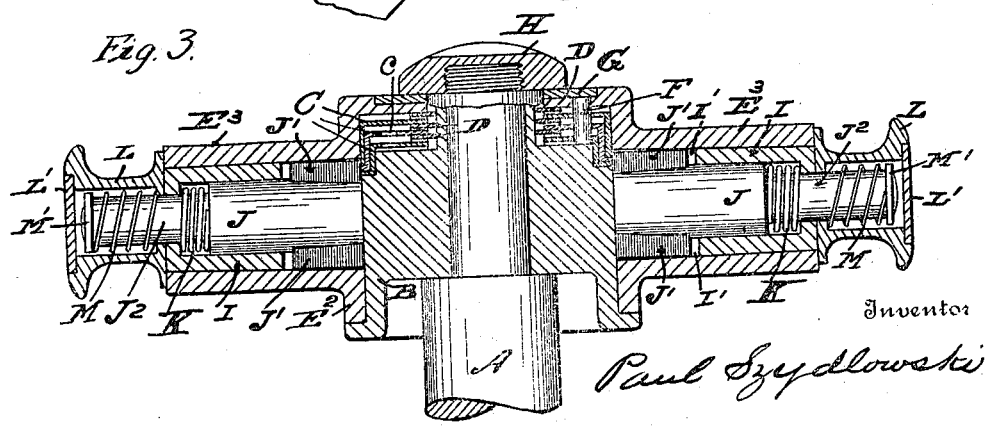

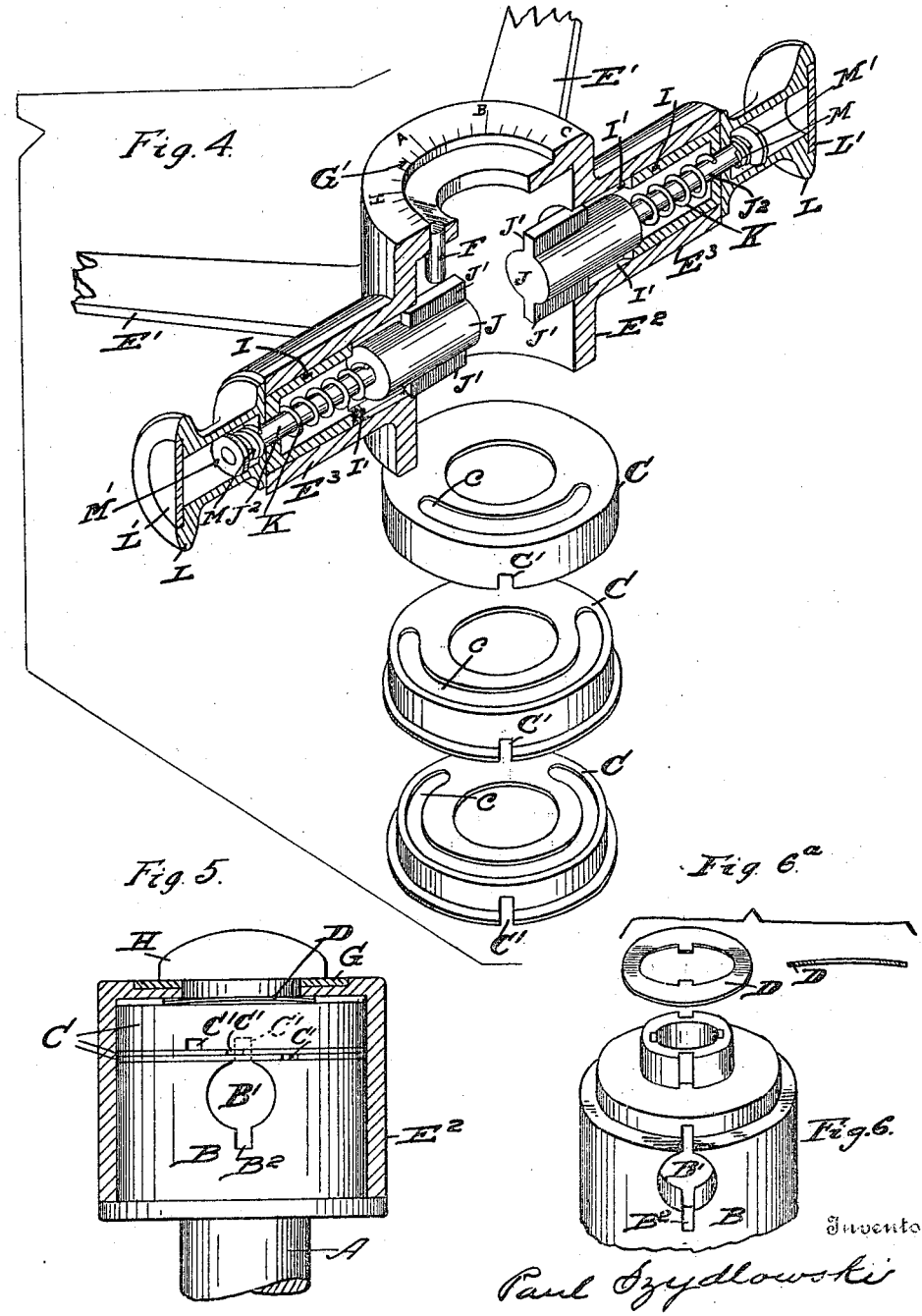

P. SZYDLOWSKI.
STEERING WHEEL LOCK FOR MOTOR DRIVEN VEHICLES.
APPLICATION FILED SEPT. 14, 1917.

1,267,476.

Patented May 28, 1918.
3 SHEETS—SHEET 3.

Inventor
Paul Szydlowski

By S. E. Thomas
Attorney

UNITED STATES PATENT OFFICE.

PAUL SZYDLOWSKI, OF HAMTRAMCK, MICHIGAN.

STEERING-WHEEL LOCK FOR MOTOR-DRIVEN VEHICLES.

1,267,476. Specification of Letters Patent. Patented May 28, 1918.

Application filed September 14, 1917. Serial No. 191,330.

*To all whom it may concern:*

Be it known that I, PAUL SZYDLOWSKI, citizen of the United States, residing at Hamtramck, county of Wayne, State of Michigan, have invented a certain new and useful Improvement in Steering-Wheel Locks for Motor-Driven Vehicles, and declare the following to be a full, clear, and exact description of the same, such as will enable others skilled in the art to which it pertains to make and use the same, reference being had to the accompanying drawings, which form a part of this specification.

My invention relates to a steering wheel lock for motor driven vehicles.

One object of this invention is to provide means whereby the steering wheel of a vehicle may be rendered temporarily inoperative to actuate the steering post in order that the vehicle may not be driven by an unauthorized person during the absence of the owner.

Another purpose of the invention is to avoid the necessity of either manually lifting the steering wheel from its normal position with relation to the steering post that it may be made inoperative to steer the vehicle:—or of providing a divided steering post, with means adapted for uncoupling and coupling the divided portions together to form a single unit that the post may be made operative or inoperative as required, and as employed by devices now in use.

With the foregoing and other objects in view, which will appear as the description proceeds, the invention resides in the combination and arrangement of parts and in the details of construction hereinafter described and claimed, it being understood that changes in the precise embodiment of the invention as herein disclosed may be made without departing from the spirit of the same.

In the drawing accompanying this specification:—

Figure 1 is a fragmentary plan view of a steering wheel showing the graduated dial of the locking mechanism.

Fig. 2 is a horizontal sectional view through the hub of the steering wheel, the steering post, and the locking bolts.

Fig. 3 is a vertical sectional view through the steering wheel hub and locking bolts.

Fig. 4 is a perspective-sectional view through the steering wheel hub, showing a plurality of slotted cup-shaped elements adapted to be nested together within the hub to control the action of the spring operated bolts.

Fig. 5 is a fragmentary detail of the steering post showing the steering wheel hub in section mounted thereon, and with the coasting locking elements housed within the hub.

Fig. 6 is a fragmentary perspective view of the locking head carried by the steering post.

Fig. 6$^a$ are perspective and cross-sectional detail views of the spring washer lodged between each of the cup-shaped disks of the locking mechanism.

Figure 7:
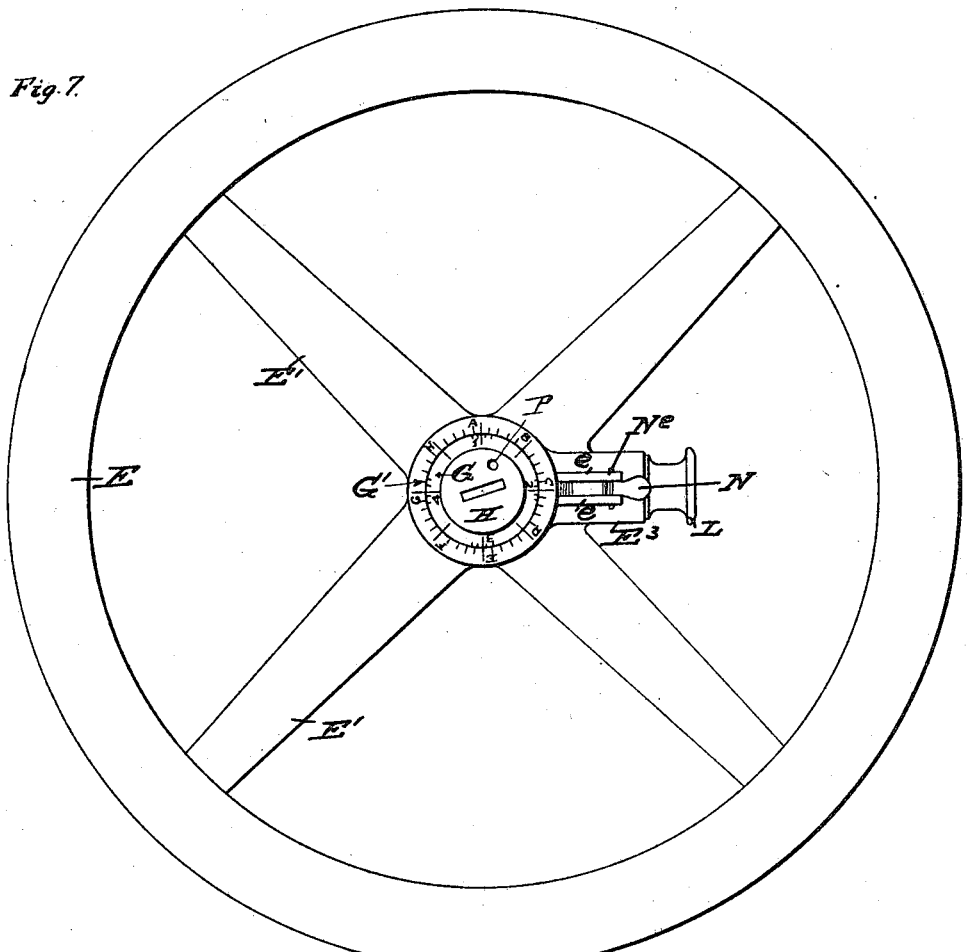

Fig. 7 is a plan view of a steering wheel, showing a modification of the locking mechanism.

Figure 8:
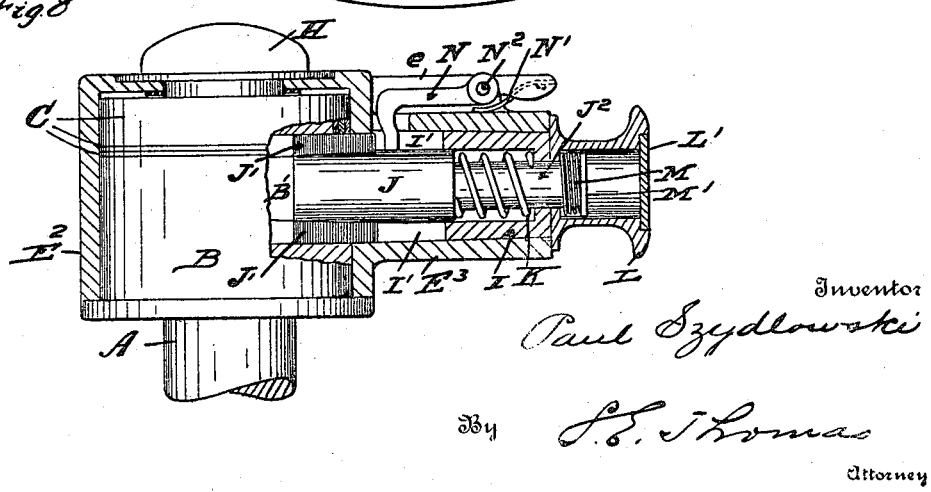

Fig. 8 is a cross-sectional view of the modification of the locking mechanism shown in the preceding figure.

Referring now to the letters of reference placed upon the drawings,—

A, denotes a steering post of a motor driven vehicle, to the upper end of which is keyed an enlarged head B. The head B, is provided with a stepped upper face over which is mounted a plurality of rotatable, inverted annular cup-shaped elements C, nested together; provided with co-acting arc-shaped slots $c$, of varying length, as indicated in Fig. 4.

D, indicates a spring washer located between the respective cup-shaped elements, keyed to the enlarged head, to insure against their rotation with the elements C.

B', are diametrically disposed transverse holes formed in the head, tapering slightly toward the steering post, from which extends a downwardly projecting slot B$^2$. C', indicates slots in the side wall of each of the cup-shaped elements C, which are adapted to be brought into opposition with the slots B$^2$, upon the rotation of the elements C, as will be hereafter explained.

E, designates a steering wheel, E', are its spokes and E$^2$, is its hub adapted to fit over the enlarged head B, of the post. Carried by and depending from the upper wall of the hub E$^2$, is a pin F, extending downwardly through the arc-shaped slots $c$, of the elements C, to actuate the latter.

G, is a graduated disk supported by the post against rotation, and lodged in a recess formed in the upper wall of the hub E$^2$, that its outer surface may be flush therewith.

G', indicates a series of graduations on the upper wall of the hub E², to be read in conjunction with the graduated disk G. H, is a cap-nut secured to the upper end of the post. Projecting from the walls of the hub E², in diametrically opposite directions are sleeves E³, the inner wall surface of which slightly taper toward the outer ends of the sleeves. Lodged within the sleeves are bushings I, the outer wall of which tapers to correspond with the inner wall of the sleeves, thereby securing them against dislodgment. Housed within the bushings are spring actuated bolts J, from which extend radial fins J', projecting into slots I', formed in the wall of the bushings. K, is a spring coiled around the projecting stem J², of the bolt, one end of which bears against a shoulder between the bolt and its projecting stem, while its other end bears against the end wall of the bushing I.

Mounted on the stem J², of the bolt is a slidable knob L, held against the end of the bushing by a spring M, coiled upon the stem of the bolt and bearing at one end against the wall of the knob; its opposite end bearing against a projecting disk M', secured to the stem of the bolt. L', is a disk secured to the knob to close the opening into the latter.

In the modification shown in Figs. 7 and 8, only one spring bolt J, is employed, but operating in conjunction therewith is a latch N, actuated by a spring N'. The latch is pivoted at N², between ribs e, integral with the sleeve E³, and is adapted to project through a slot in the sleeve, and also one in the bushing I, that it may intercept the fin J' of the spring actuated bolt J, to prevent its accidental withdrawal. P, is an oil hole in the graduated disk through which lubricant may be admitted.

Having indicated the several parts by reference letters, the construction and operation of the device will be readily understood.

It will first be assumed that the steering wheel is in locked relation with the steering post and that the owner of the vehicle is about to leave the same and desires to render the steering wheel inoperative to guide the car that it may not be driven away during his absence by an unauthorized person. To effect this result the bolts J, are withdrawn from engagement with the enlarged head B, by grasping the knobs L, and pulling them in opposite directions against the action of the springs K, until the end of the bolts are withdrawn from the enlarged head. The wheel is then given a slight rotation, which forces the rotation of the cup-shaped elements C,—due to the swinging action of the pin F,—which projects through the radial slots in the several elements C, thereby disarranging the slots C', in the side walls of the latter with reference to each other and their previous opposition in respect to the slots B², formed in the enlarged head B. Thus the spring actuated bolts J, are held from returning to their former locked relation with the enlarged head of the steering post; the steering wheel being free to turn upon the post, but having no control over the action of the latter. To effect a locking engagement between the steering wheel and the post the several cup-shaped elements must first be shifted so that the slots C', in their side walls, register with each other and in opposition to the slot B², in the enlarged head. This result is secured through the action of the pin F, carried by the hub of the steering wheel as previously explained. The arbitrary degree of rotation of the several cup-shaped elements is determined by the adjustment of the graduated disks with reference to each other in a manner well understood.

Upon the slots C', of the cup-shaped elements being brought into opposition with the slots B², of the enlarged head, the spring actuated bolts J, will enter the holes B' in the enlarged head, thereby locking the steering wheel in operative relation with the post.

To insure against the action of a mischievously inclined person who may seek to strike the ends of the spring actuated bolts with a hammer for the purpose of driving or otherwise indenting their opposite ends in the wall of the enlarged head, I have provided the spring actuated knobs L, which while adapted for the withdrawal of the bolts serves to protect the outer ends of the bolts from maliciously applied blows. It will be seen that the spring M, forces the knob when released against the end of the sleeves E³, when the bolts are in either their released or engaged position, the end of the bolts being thus protected.

Having thus described my invention, what I claim is—

1. In a device of the character described, a steering post, a steering wheel its hub sleeved upon the steering post, a spring actuated bolt carried by the hub of the steering wheel adapted to lock the wheel in operative relation to the post, and means operable by the rotary movement of the steering wheel independently of the steering post for controlling the entry of said bolt into locked relation with the steering post.

2. In a device of the character described, a steering post, a steering wheel with its hub sleeved upon the post, a spring actuated bolt carried by the hub of the steering wheel adapted when released to lock the wheel in operative relation to the post, means operable by the rotary movement of the steering wheel independently of the steering post for controlling the locking engagement of the spring actuated bolt with the post, and means to secure the bolt in its locked relation with the post until manually released.

3. In a device of the character described, a steering post having an enlarged head, a steering wheel having a hub fitted to the enlarged head of the post and free to turn thereon, spring actuated bolts carried by the hub of the steering wheel adapted to lock the wheel to the post that it may control the action of the latter, and means operable by the rotary movement of the steering wheel independently of the steering post adapted to control the entry of the spring actuated bolts into locking relation with the post.

4. In a device of the character described, a steering post, a steering wheel mounted on the steering post, a bolt carried by the wheel and adapted to lock the same in operative relation to the post, and means for controlling the entry of the bolt into locking relation with the steering post, said means including a plurality of rotary elements having registering means for forming a passageway for the bolt, and means carried by the steering wheel and operable by the movement of the steering wheel independently of the post to actuate said rotary members for moving the same into and out of registering relation.

5. In a device of the character described, a steering post provided with an enlarged head having oppositely disposed transverse openings, a plurality of independently operated rotatable elements mounted on said head having arc-shaped slots of varying length and also transverse openings adapted to be brought into registration with the transverse openings in the enlarged head to admit of the entry of a locking bolt, a steering wheel having a hub fitted to the enlarged head of the post provided with a downwardly directed pin extending through the arc-shaped slots of the rotatable elements to operate the latter, spring actuated bolts supported by said hub, a graduated dial carried by the head, and graduations carried by the hub adapted to coördinate with the first named graduations to indicate the required arbitrary degree of rotation necessary to give to the wheel to bring the transverse openings of the rotatable elements into registration with the transverse openings of the enlarged head, whereby the spring actuated bolts may enter to lock the steering wheel to the post.

6. In a device of the character described, a steering post provided with an enlarged head having oppositely disposed transverse openings, a plurality of independently operated rotatable elements nested together above said enlarged head having arc-shaped slots of unequal length and also transverse openings adapted to be brought into registration with the transverse openings in the enlarged head, a steering wheel having a hub fitted to the enlarged head of the post provided with a downwardly directed pin adapted to project through the arc-shaped slots of the rotatable elements, transverse spring actuated bolts supported by the hub to lock the steering wheel to the post, slidable knobs carried by the ends of the bolts adapted for manually withdrawing the latter from locking engagement with the post, springs sleeved upon the bolts to force the knobs against the walls of the hub, and means for indicating the necessary adjustment to be given the steering wheel whereby the several elements may be placed in condition to receive the spring actuated bolts for locking the wheel in operative relation to the post.

In testimony whereof, I sign this specification in the presence of two witnesses.

PAUL SZYDLOWSKI.

Witnesses:
 JOHN CONSIDINE, Jr.,
 SAMUEL E. THOMAS.